(12) United States Patent
Lee et al.

(10) Patent No.: US 11,153,736 B2
(45) Date of Patent: Oct. 19, 2021

(54) METHOD FOR EXECUTING PUBLIC WARNING SYSTEM AND DEVICE SUPPORTING SAME

(71) Applicant: LG ELECTRONICS INC., Seoul (KR)

(72) Inventors: Youngdae Lee, Seoul (KR); Jaewook Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 16/495,814

(22) PCT Filed: Mar. 21, 2018

(86) PCT No.: PCT/KR2018/003248
§ 371 (c)(1),
(2) Date: Sep. 19, 2019

(87) PCT Pub. No.: WO2018/174533
PCT Pub. Date: Sep. 27, 2018

(65) Prior Publication Data
US 2020/0100083 A1    Mar. 26, 2020

Related U.S. Application Data

(60) Provisional application No. 62/474,576, filed on Mar. 21, 2017.

(51) Int. Cl.
*H04W 4/90* (2018.01)
*H04W 76/50* (2018.01)
(Continued)

(52) U.S. Cl.
CPC ............. *H04W 4/90* (2018.02); *H04W 48/14* (2013.01); *H04W 68/005* (2013.01);
(Continued)

(58) Field of Classification Search
CPC ....... H04W 4/90; H04W 76/50; H04W 76/27; H04W 48/14; H04W 68/005;
(Continued)

(56) References Cited

U.S. PATENT DOCUMENTS

2009/0233634 A1\* 9/2009 Aghili ................... H04W 76/50
455/466
2012/0327837 A1\* 12/2012 Harrington ........... H04W 4/021
370/312
(Continued)

FOREIGN PATENT DOCUMENTS

| CN | 101686541 | 3/2010 |
|---|---|---|
| CN | 103561398 | 2/2014 |
| CN | 104618880 | 5/2015 |

OTHER PUBLICATIONS

The State Intellectual Property Office of the People's Republic of China Application Serial No. 201880019951.X, Office Action dated Sep. 25, 2020, 7 pages.
(Continued)

*Primary Examiner* — Jaime M Holliday
(74) *Attorney, Agent, or Firm* — Lee, Hong, Degerman, Kang & Waimey

(57) ABSTRACT

Provided is a method for a terminal executing a public warning system (PWS) in a wireless communication system. The method comprises the steps of: receiving a primary message associated with a PWS from a base station; and transmitting, to the base station, a feedback message for requesting a secondary message corresponding to the primary message.

3 Claims, 11 Drawing Sheets

(51) Int. Cl.
*H04W 76/27* (2018.01)
*H04W 48/14* (2009.01)
*H04W 68/00* (2009.01)
*H04W 68/02* (2009.01)
*H04W 74/08* (2009.01)

(52) U.S. Cl.
CPC ....... *H04W 68/02* (2013.01); *H04W 74/0833* (2013.01); *H04W 76/27* (2018.02); *H04W 76/50* (2018.02)

(58) Field of Classification Search
CPC . H04W 68/02; H04W 74/0833; H04W 48/08; H04W 68/00
See application file for complete search history.

(56) References Cited

U.S. PATENT DOCUMENTS

| | | | |
|---|---|---|---|
| 2014/0045447 A1* | 2/2014 | Nanjaiah | H04W 4/90 |
| | | | 455/404.1 |
| 2015/0249912 A1* | 9/2015 | Lee | H04W 4/90 |
| | | | 455/404.1 |
| 2015/0280845 A1 | 10/2015 | Ballakur et al. | |
| 2015/0350863 A1* | 12/2015 | Tsutsui | H04W 4/90 |
| | | | 455/404.1 |
| 2016/0234736 A1 | 8/2016 | Kubota et al. | |
| 2016/0234759 A1 | 8/2016 | Kubota et al. | |
| 2017/0034681 A1 | 2/2017 | Netto et al. | |
| 2018/0249387 A1* | 8/2018 | Zhang | H04W 48/08 |
| 2019/0223082 A1* | 7/2019 | He | H04W 48/10 |

OTHER PUBLICATIONS

European Patent Office Application Serial No. 18770653.6, Search Report dated Nov. 19, 2019, 10 pages.
PCT International Application No. PCT/KR2018/003248, International Search Report dated Jun. 19, 2018, 6 pages.

* cited by examiner

METHOD FOR EXECUTING PUBLIC WARNING SYSTEM AND DEVICE SUPPORTING SAME

CROSS-REFERENCE TO RELATED APPLICATIONS

This application is the National Stage filing under 35 U.S.C. 371 of International Application No. PCT/KR2018/003248, filed on Mar. 21, 2018, which claims the benefit of U.S. Provisional Application No. 62/474,576, filed on Mar. 21, 2017, the contents of which are all hereby incorporated by reference herein in their entirety.

BACKGROUND OF THE INVENTION

Field of the Invention

The present invention relates to a technology for executing a public warning system (PWS) in a new radio access technology (NR).

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

As the amount of data communication increases, on-demand system information (OSI) has been proposed. In the case of the on-demand system information, the UE can request system information from the cell, and the network receiving the request can transmit the requested system information to the UE. On this wise, discussions on utilizing radio resource efficiently are constantly fulfilled.

On the other hand, a public warning system (PWS) refers to a warning information provider that detects disasters and warning conditions and provides warning to operators, and a general warning notification system provided by a mobile communication provider that delivers warning information directly to a terminal. The PWS provides services to distribute Earthquake and Tsunami Warning System (ETWS), Commercial Mobile Alert System (CMAS), Korean Public Alert System (KPAS), and European Public Warning System (EU-Alert) warning messages in GSM, UMTS, and E-UTRAN.

SUMMARY OF THE INVENTION

According to the related art, it is not guaranteed that a primary ETWS message is necessarily provided to a terminal before a secondary ETWS message.

In an aspect, a method for executing, by a terminal, a public warning system (PWS) in a wireless communication system is provided. The method includes receiving a primary message associated with the PWS from a base station; and transmitting a feedback message requesting a secondary message corresponding to the primary message to the base station.

The primary message may be transmitted to the terminal through at least one of minimum system information (SI), system information block 10 (SIB10), and a paging message.

The method may further include receiving the secondary message from the base station.

The secondary message may be provided by the base station provided that the feedback message is received from the terminal.

The secondary message may be transmitted through dedicated signaling or a system information message.

The primary message and the secondary message may be associated with any one of an Earthquake & Tsunami Warning System (ETWS) notification message, a Commercial Mobile Alert System (CMAS) notification message, and a Korean Public Alert System (KPAS) notification message.

The feedback message may be any one of a random access preamble, a MAC control element, and an RRC message.

The feedback message may request transmission of the secondary message by indicating at least one of a message identifier (meesageIdentifier) indicating the source and type of the secondary message, a serial number (serialNumber) for identifying whether the secondary message has been changed, a warning message segment (warningMessageSegment) indicating a segment of an element included in the secondary message, a warning message segment number (warningMessageSegmentNumber) indicating a segment number of an element included in the secondary message, a warning message segment type (warningMessageSegmentType) indicating a segment type of an element included in the secondary message, and a data coding scheme (dataCodingScheme) of the secondary message.

In another aspect, a terminal for executing a public warning system (PWS) in a wireless communication system is provided. The terminal includes a memory; a transceiver; and a processor connecting the memory and the transceiver with each other and configured to: receive a primary message associated with the PWS from a base station, and transmit a feedback message requesting a secondary message corresponding to the primary message to the base station.

The primary message may be transmitted to the terminal through at least one of system information block and a paging message.

The processor may be configured to receive the secondary message from the base station.

The secondary message may be provided by the base station provided that the feedback message is received from the terminal.

The secondary message may be transmitted through dedicated signaling or a system information message.

The primary message and the secondary message may be associated with any one of an ETWS notification message, a CMAS notification message, and a KPAS notification message.

The feedback message may be any one of a random access preamble, a MAC control element, and an RRC message.

Advantageous Effects

According to the embodiments of the present invention, the base station may transmit the secondary message to the terminal only when receiving a request for transmission of system information requesting the transmission of the secondary message. Thereby, it is possible to guarantee that the primary message is received before the secondary message, and it is possible to prevent the transmission of the secondary message even if the terminal does not exist in a specific cell.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present invention are not limited thereto.

Figure 1:
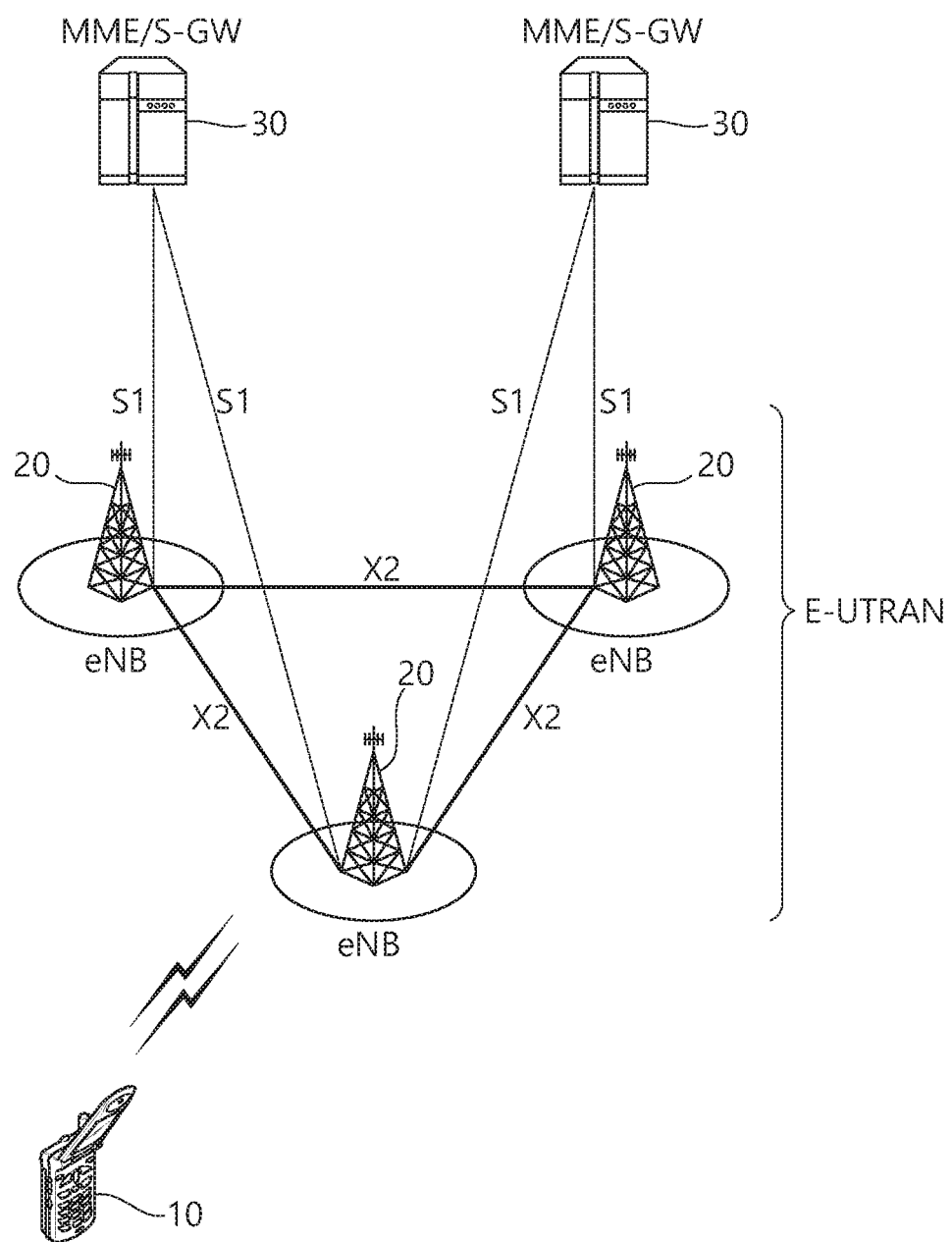
FIG. 1 shows an LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
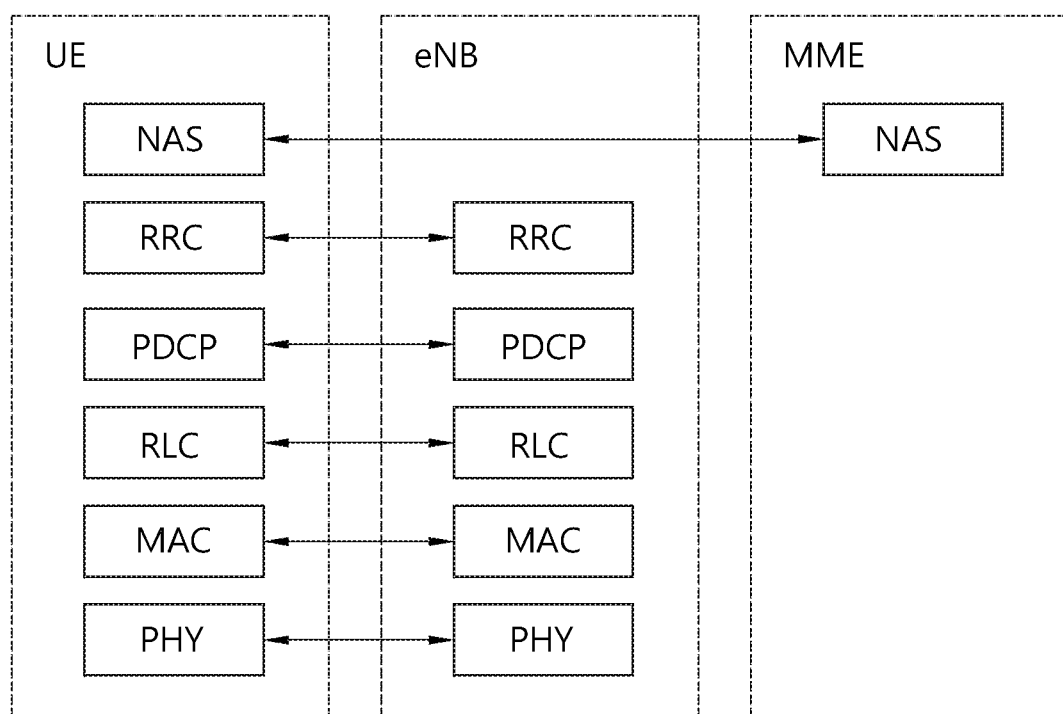
FIG. 2 shows a control plane of a radio interface protocol of an LTE.
Figure 3:
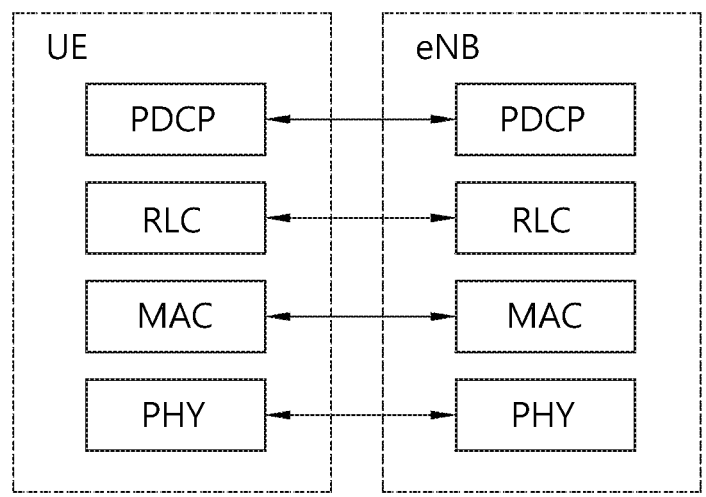
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a pointto-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network structure is described.

Figure 5:
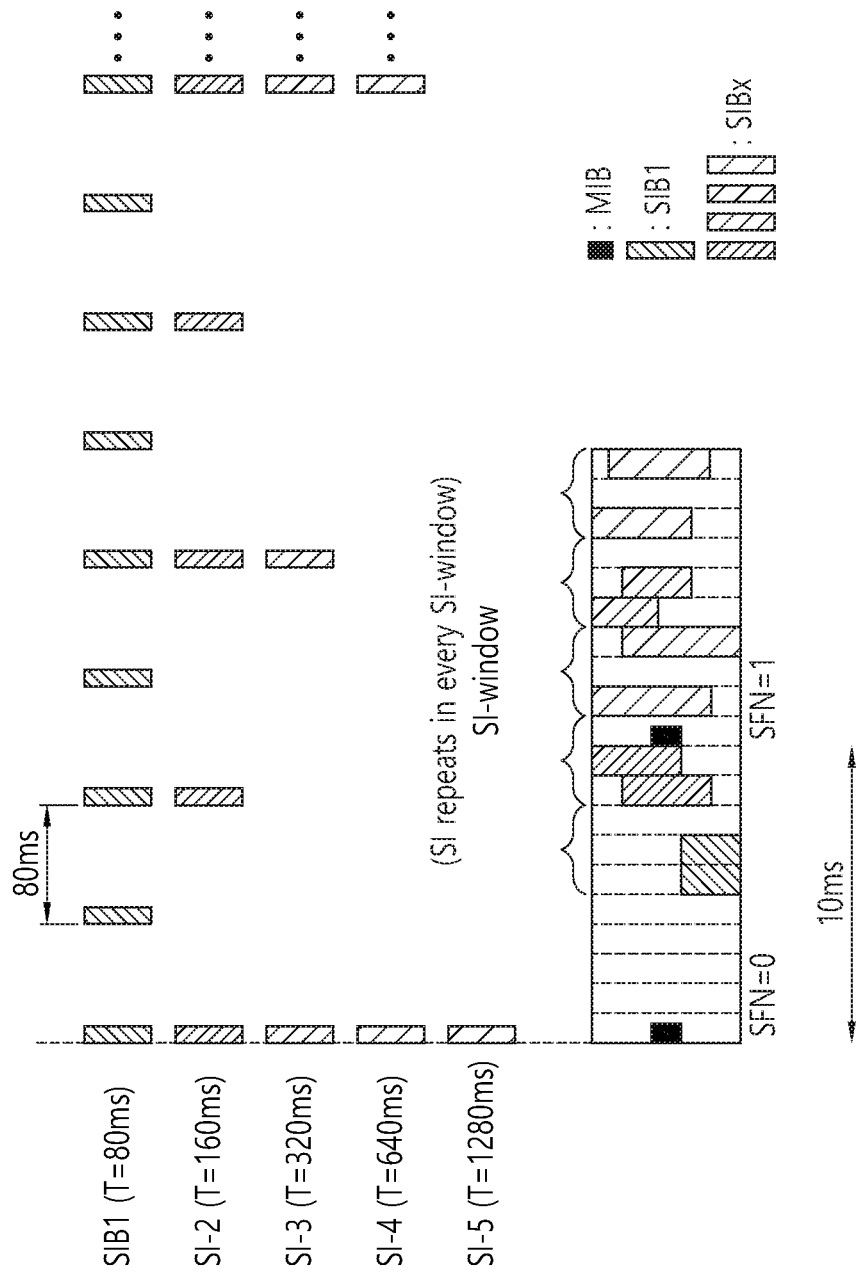
FIG. 5 shows an example in which a master information block (MIB), a system information block1 (SIB1), and other system information blocks (SIB) are transmitted.

FIG. 5 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Figure 4:
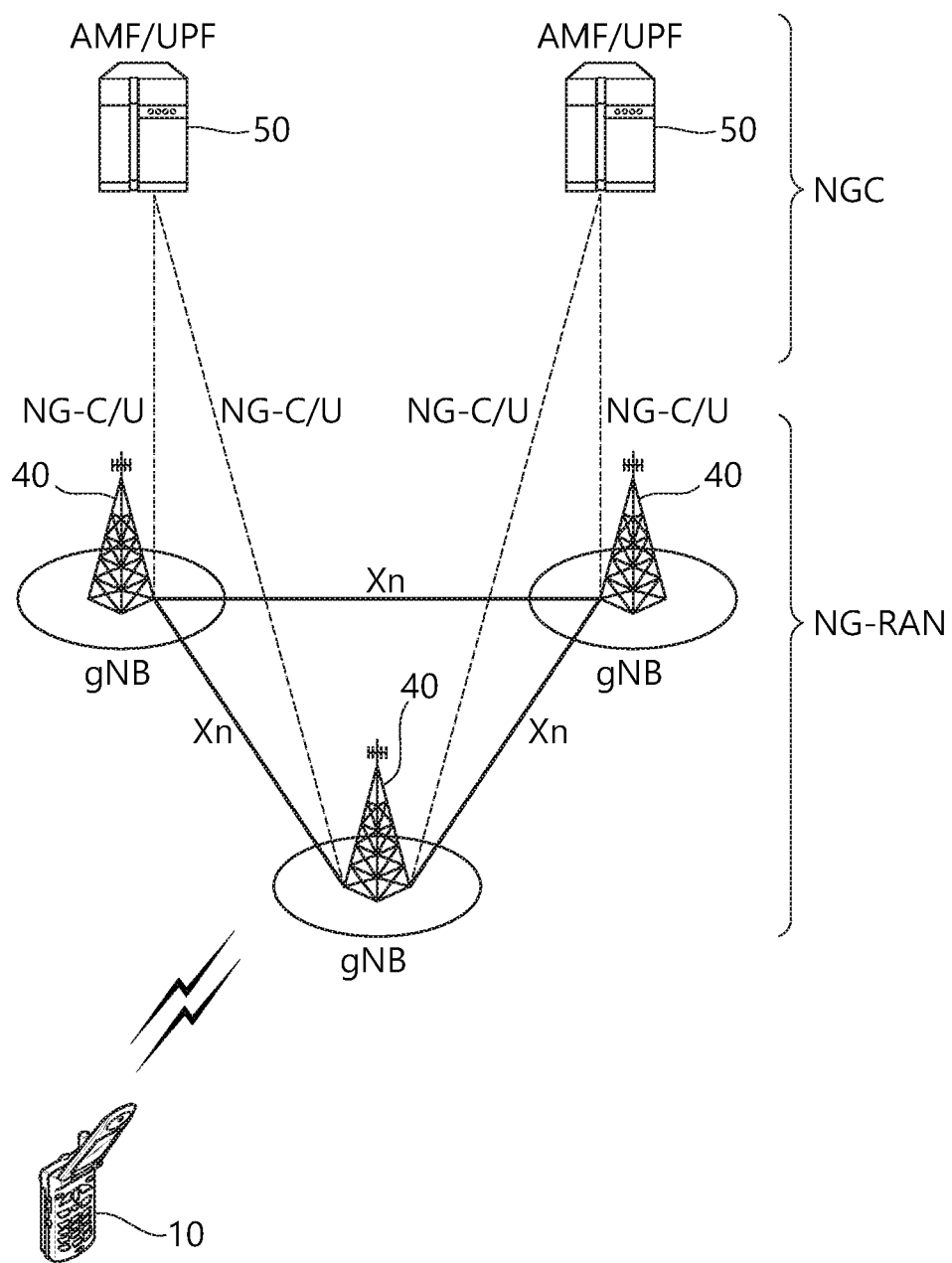
FIG. 4 shows a structure of a 5G system.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, System Information (SI) is Described.

FIG. 5 shows an example in which a master information block (MIB), a system information block1 (SIB1), and other system information blocks (SIB) are transmitted.

An LTE cell broadcasts basic parameters necessary for the operation of an IDLE_MODE terminal and a CONNECTED_MODE terminal by dividing the parameters into a plurality of information blocks. Examples of the information block include MIB, SIB1, SIB2, and other system information blocks (SIBn).

The MIB includes the most basic parameter necessary for the terminal to access the cell. Referring to FIG. 5, an MIB message is broadcasted through a BCH at a period of 40 ms, and an MIB transmission is repeated in all radio frames within the period of 40 ms. The terminal receives an SIB message using the parameter received from the MIB.

There are several types of SIBs.

The SIB1 includes information related to cell access, and in particular, includes scheduling information of other SIBs (SIB2 to SIBn) except the SIB1. SIBs having the same transmission period among other SIs except the SIB1 are included in the same system information (SI) message and transmitted. Therefore, the scheduling information includes a mapping relationship between each SIB and the SI message. The SI message is transmitted in a window of a time domain (SI-window), and each SI message is associated with one SI-window. Since the SI-windows of different SIs do not overlap, only one SI message is transmitted in any SI-window. Therefore, the scheduling information includes a length of the SI-window and an SI transmission period. The time/frequency at which the SI message is transmitted is determined by a dynamic scheduling of the base station. The SIB1 is broadcast through a downlink shared channel (DL-SCH) in eight radio frame periods (i.e., 80 ms periods), and the SIB1 is repeatedly retransmitted on a subframe 5 of a radio frame of SFN mod 2 within the 80 ms period.

Not all SIBs should always exist. For example, SIB9 is not necessary in a mode in which the HeNB is constructed by the operator, and SIB13 is not necessary unless the MBMS is provided in the corresponding cell.

The system information is commonly applied to all terminals connected in the cell, and the terminal must always maintain the latest system information for correct operation. When the system information is changed, the terminals should know in advance a time point when the base station transmits new system information.

On the other hand, SIB10 to SIB12 include a public warning message such as, for example, an earthquake warning.

Table 1 shows elements included in the SIB10. The SIB10 includes an earthquake and tsunami warning system (ETWS) primary notification.

TABLE 1

```
-- ASN1START

SystemInformationBlockType10 ::= SEQUENCE {
    messageIdentifier        BIT STRING (SIZE (16)),
    serialNumber             BIT STRING (SIZE (16)),
    warningType              OCTET STRING (SIZE (2)),
    dummy                    OCTET STRING (SIZE (50)) OPTIONAL,  -- Need OP
    ...,
    lateNonCriticalExtension OCTET STRING                        OPTIONAL
}
-- ASN1STOP
```

A messageIdentifier field is for identifying the source and type of the ETWS notification. A SerialNumber field is for identifying the variant of the ETWS notification. In addition, a warningType field is for identifying the warning type of the ETWS primary notification, and provides information about an emergency user and terminal popup.

Table 2 shows elements included in the SIB11. The SIB11 includes an ETWS secondary notification.

TABLE 2

```
-- ASN1START
SystemInformationBlockType11 ::= SEQUENCE {
    messageIdentifier              BIT STRING (SIZE (16)),
    serialNumber                   BIT STRING (SIZE (16)),
    warningMessageSegmentType      ENUMERATED {notLastSegment, lastSegment},
    warningMessageSegmentNumber    INTEGER (0..63),
    warningMessageSegment          OCTET STRING,
    dataCodingScheme               OCTET STRING (SIZE (1)) OPTIONAL, -- Cond Segment1
    ...,
    lateNonCriticalExtension              OCTET STRING          OPTIONAL
}
-- ASN1STOP
```

A messageIdentifier field is for identifying the source and type of the ETWS notification. A SerialNumber field is for identifying the variant of the ETWS notification. A warningMessageSegment field transmits a segment of the element of the warning message content. A warningMessageSegmentNumber field indicates the segment number of the ETWS warning message segment included in the SIB. A warningMessageSegmentType indicates whether the included ETWS warning message segment is a past segment.

Table 3 shows elements included in the SIB12. The SIB12 includes a commercial mobile alert system (CMAS) notification.

TABLE 3

```
-- ASN1START
SystemInformationBlockType12-r9 ::=    SEQUENCE {
    messageIdentifier-r9               BIT STRING (SIZE (16)),
    serialNumber-r9                    BIT STRING (SIZE (16)),
    warningMessageSegmentType-r9       ENUMERATED {notLastSegment, lastSegment},
    warningMessageSegmentNumber-r9     INTEGER (0..63),
    warningMessageSegmentNumber-r9     OCTET STRING,
    dataCodingScheme-r9                OCTET STRING (SIZE (1)) OPTIONAL,--Cond
Segment1
    lateNonCriticalExtension           OCTET STRING          OPTIONAL,
    ...
}
-- ASN1STOP
```

A messageIdentifier field is for identifying the source and type of the CMAS notification. A SerialNumber field is for identifying the variant of the CMAS notification. A warningMessageSegment field transmits a segment of the element of the warning message content. A warningMessageSegmentNumber field indicates the segment number of the CMAS warning message segment included in the SIB. A warningMessageSegmentType indicates whether the included CMAS warning message segment is a past segment.

Hereinafter, a Public Warning System (PWS) is Described.

The public warning system (PWS) refers to a warning information provider that detects disasters and warning conditions and provides warning to operators, and a general warning notification system provided by a mobile communication provider that delivers warning information directly to a terminal. The PWS provides services to distribute Earthquake and Tsunami Warning System (ETWS), Commercial Mobile Alert System (CMAS), Korean Public Alert System (KPAS), and European Public Warning System (EU-Alert) warning messages in GSM, UMTS, and E-UTRAN.

The ETWS primary notification and/or the ETWS secondary notification may occur at any time. The paging message is used to inform RRC_IDLE in RRC_CONNECTED and an ETWS capable UE in the UE regarding the presence of the ETWS primary notification and/or the ETWS secondary notification. When the UE receives a paging message including etws-Indication, the UE receives the ETWS primary notification and/or the ETWS secondary notification according to schedulingInfoList included in SystemInformationBlockType1. When the UE receives the paging message including the etws-Indication while obtaining the ETWS notification, the UE must continue to obtain the ETWS notification based on the previously obtained schedulingInfoList until the UE obtains schedulingInfoList again in SystemInformationBlockType1.

The UE does not need to periodically check schedulingInfoList included in SystemInformationBlockType1, but triggers the paging message including etws-Indication to obtain schedulingInfoList again included in SystemInformationBlockType1 for scheduling change for SystemInformationBlockType10 and SystemInformationBlockType11. The UE may or may not receive the paging message that includes etws-Indication and/or systemInfoModification when the ETWS is no longer scheduled.

The ETWS primary notification is included in SystemInformationBlockType10 and the ETWS secondary notification is included in SystemInformationBlockType11. Segmentation may be applied to a secondary notification transmission. The segmentation is fixed for the transmission of a predetermined secondary notification in the cell (i.e., the same segment size for a given segment with the same message identifier, serialNumber and warningMessageSegmentNumber). The ETWS secondary notification corresponds to a single CB data IE.

The commercial mobile alert system (CMAS) notification may also occur at any point in time. The paging message is used to notify RRC_IDLE in RRC_CONNECTED and a CMAS capable UE in the UE regarding the presence of one or more CMAS notifications. When the UE receives a paging message including cmas-Indication, the UE starts to receive the CMAS notification according to schedulingInfoList included in SystemInformationBlockType1. When the UE receives the paging message including the cmas-Indication while obtaining the CMAS notification, the UE must continue to obtain the CMAS notification based on the previously obtained schedulingInfoList until the UE obtains schedulingInfoList again in SystemInformationBlockType1.

The UE does not need to periodically check schedulingInfoList included in SystemInformationBlockType1, but triggers the paging message including cmas-Indication to obtain schedulingInfoList again included in SystemInformationBlockType1 to schedule a change for SystemInformationBlockType12. The UE may or may not receive the paging message that includes cmas-Indication and/or systemInfoModification when SystemInformationBlockType12 is no longer scheduled.

The CMAS notification is included in SystemInformationBlockType12. Segmentation may be applied to a CMAS notification transmission. The segmentation is fixed for the transmission of a given CMAS notification in the cell (i.e., the same segment size for a given segment with the same message identifier, serialNumber and warningMessageSegmentNumber). The E-UTRAN does not interleave the transmission of CMAS notification. That is, all segments of the given CMAS notification transmission are transmitted before the segments of other CMAS notifications. The CMAS notification corresponds to a single CB data IE.

System information in NG-RAN (or new radio access technology (NR)) is described. As the amount of data communication increases, discussions on utilizing radio resource efficiently are constantly fulfilled. As part of such an effort, on-demand system information (OSI) has been proposed. In the case of the on-demand system information, the UE may request system information from the cell, and the network receiving the request may transmit the requested system information to the UE.

Figure 6:
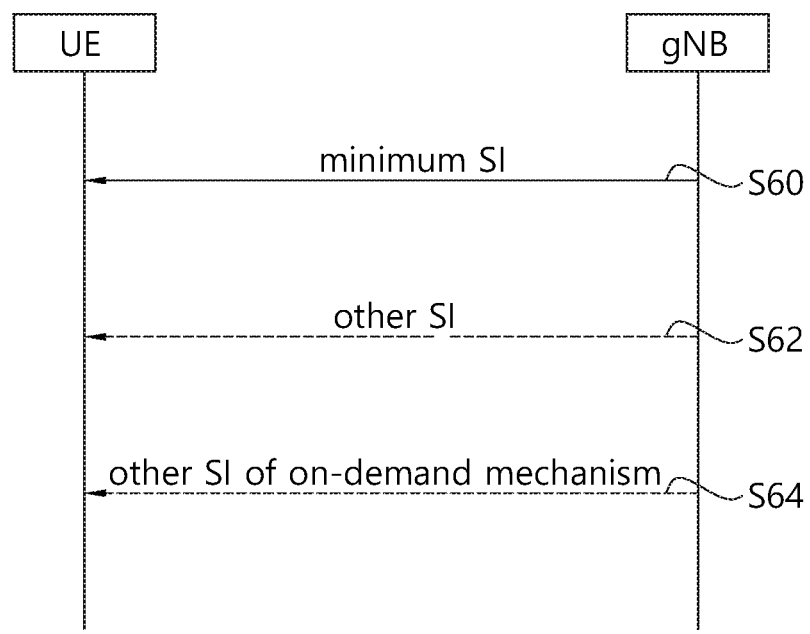
FIG. 6 illustrates transmission of on-demand system information.

FIG. 6 shows transmission of on-demand system information. The system information may be divided into minimum SI and other SI. The minimum SI may be called another term, for example, remaining SI. The minimum SI may include, for example, a master information block (MIB), a system information block 1 (SIB1), or the like. In S60, the base station (e.g., gNB) may provide the minimum SI to the UE. The minimum SI may be broadcast periodically, and may be provided without further request. The minimum SI may be provided through basic information required for initial access to the cell, information for periodically obtaining other SI broadcasts, or on demand. The minimum SI includes at least SFN, a list of PLMNs, cell IDs, cell camping parameters, and RACH parameters. When the network allows an on-demand mechanism, the parameters required to request other SI blocks (e.g., RACH preamble requests, if required) are included in the minimum SI. In S62, the base station may transmit other SI to the UE. Other SI may be broadcast periodically, and may be provided selectively. Other SI includes everything that is not broadcast in the minimum SI. In a cell reselection procedure, neighbor cell information is regarded as other SI. In S64, other SI may be broadcast by the network or according to the request from the UE, or provided in a dedicated manner. The UE may request one or more SIs or all SIs (e.g., SIB) in a single request. The UE needs to know before the UE transmits other SI request whether other SI required by the UE is available in the cell and whether other SI requested by the UE is broadcast. This may be done by examining the minimum SI that provides scheduling information for other SI, including SIB type, validity information, SI periodicity, and SI-window information based on LTE. The scheduling information in the minimum SI includes an indicator indicating whether the corresponding SI-block is broadcast periodically or provided when needed. When the minimum SI indicates that the SIB is not broadcast, the UE does not assume that the SIB is broadcast periodically in the SI-window every SI period. Therefore, the UE may transmit an SI request to receive the SIB. After the UE transmits the SI request to receive the requested SIB, the UE monitors the SI window of the requested SIB in one or more SI cycles of the SIB.

As described above, the public warning system (PWS) may broadcast the ETWS message or the CMAS message through the system information block in one or more cells. The ETWS message is divided into a primary ETWS message and a secondary ETWS message. The primary ETWS message and the secondary ETWS message correspond to the above-described ETWS primary notification and ETWS secondary notification, respectively. The primary ETWS message needs to be transmitted to the terminal before the secondary ETWS message. The terminal receives the primary ETWS message before the secondary ETWS message is received. However, according to the related art, it is unclear how the primary ETWS message is transmitted to the terminal earlier than the secondary ETWS message.

Hereinafter, in order to solve the above described problem, a method for executing a PWS in NG-RAN (or new radio access technology (NR)) according to an embodiment of the present invention is described. In the present description, the base station may be an eNB or gNB, where the gNB refers to a base station in NR. However, these terms are classified according to the above-described operations and functions, and these terms may be changed in some cases.

According to the method for executing a public warning system according to an embodiment of the present invention, the terminal may receive a primary message through broadcasting or may receive a paging including the primary message. Thereafter, the terminal may request transmission of a secondary message to the base station upon receiving the primary message and/or the paging.

The primary message and the secondary message may be public warning messages corresponding to any one of an ETWS notification message, a CMAS notification message, and a KPAS notification message. The primary message may be broadcast through a system information block, for example SIB10. That is, the base station may broadcast an information element (IE) corresponding to the primary message (e.g., ETWS primary notification) through the system information block 10 (SIB10). In addition, the primary message may be transmitted to the terminal through the paging. The secondary message may be broadcast through a system information block, for example SIB11. Alternatively, the secondary message may be transmitted to the terminal in a dedicated signaling manner.

According to an exemplary embodiment of the present invention, the terminal may firstly receive any one of the following messages.
  primary message
  paging message
  minimum SI (e.g., MIB or SIB1)

When the terminal receives the primary message or receives the paging message or minimum SI including the primary message, or when any one of the above-mentioned messages indicates that it requires a request for the secondary message, the terminal may request the transmission of the secondary message to the base station. According to an embodiment, when the minimum SI does not schedule subsequent broadcast of the secondary message, the terminal may request the transmission of the secondary message to the base station. In other words, when the primary message is received, the terminal may separately request the transmission of the secondary message.

The terminal may request the transmission of the second message by transmitting an SI request to the base station in a random access procedure. For example, the terminal may transmit the SI request through a specific random access preamble, a MAC control element or an RRC message. The SI request may indicate to send the secondary message (e.g., ETWS secondary notification) to the base station. Specifically, the SI request may be configured to transmit the secondary message by indicating at least one of a message identifier (meesageIdentifier) indicating the source and type of the secondary message, a serial number (serialNumber) for identifying whether the secondary message has been changed, a warning message segment (warningMessageSegment) indicating a segment of an element included in the secondary message, a warning message segment number (warningMessageSegmentNumber) indicating a segment number of an element included in the secondary message, a warning message segment type (warningMessageSegmentType) indicating a segment type of an element included in the secondary message, and a data coding scheme (dataCodingScheme) of the secondary message. The messageIdentifier, serialNumber, warningMessageSegmentType, warningMessageSegmentNumber, warningMessageSegment, and dataCodingScheme may be elements included in the SIB11 (see Table 2) and the SIB12 (see Table 3).

After receiving the SI request from the terminal, the base station may transmit the secondary message indicated by the SI request to the terminal. That is, the base station may transmit the secondary message to the terminal only when receiving the SI request that requests the transmission of the secondary message. Thereby, it is possible to guarantee that the primary message is received before the secondary message, and it is possible to prevent the transmission of the secondary message even if the terminal does not exist in a specific cell. Specifically, the base station may transmit the secondary message to the terminal through dedicated signaling such as a unicast scheme. In addition, the base station may transmit the secondary message to the terminal through system information such as a broadcast scheme. The base station may transmit an information element (IE) of the SIB11 including the secondary message (e.g., ETWS secondary notification) to the terminal.

Figure 7:
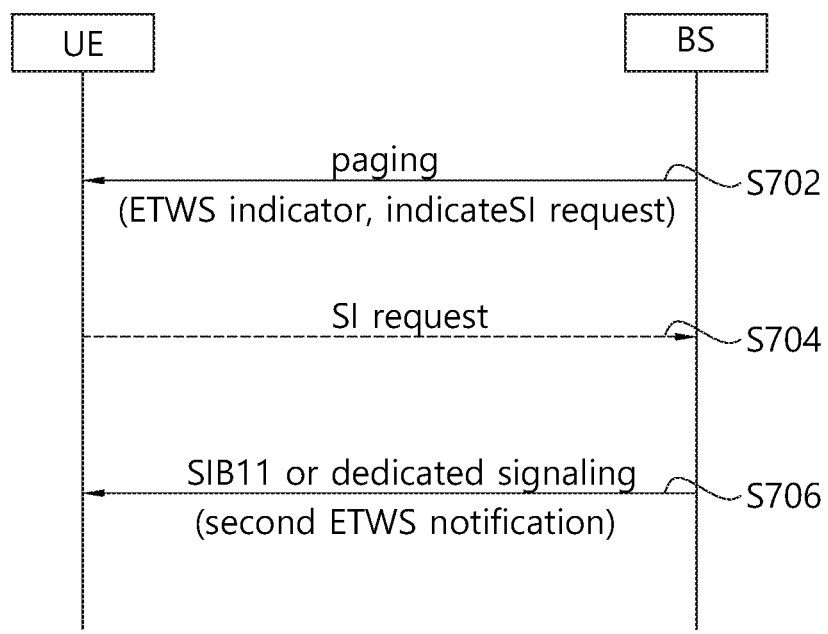
FIG. 7 is a flowchart for describing a method for executing a public warning system according to an embodiment of the present invention.

FIG. 7 is a flowchart for describing a method for executing a public warning system according to an embodiment of the present invention.

In 702, the base station may transmit the primary message to the terminal through paging. The primary message may include an ETWS indicator. Specifically, the ETWS indicator is a PWS related primary notification, which may indicate that a PWS related secondary message needs to be transmitted. That is, the ETWS indicator may indicate that a subsequent PWS related secondary message will be transmitted when the SI request is received from the terminal to the base station.

In S704, the terminal may request transmission of the PWS related secondary message through the SI request. The PWS related secondary message may be, for example, an ETWS secondary notification.

In 706, the base station may transmit the PWS related secondary message to the terminal. According to an embodiment, the base station may provide the PWS related secondary message to the terminal in a broadcast scheme by transmitting the system information block (e.g., SIB11). In addition, the base station may transmit the PWS related secondary message to the terminal through a dedicated signaling scheme such as unicast transmission.

Figure 8:
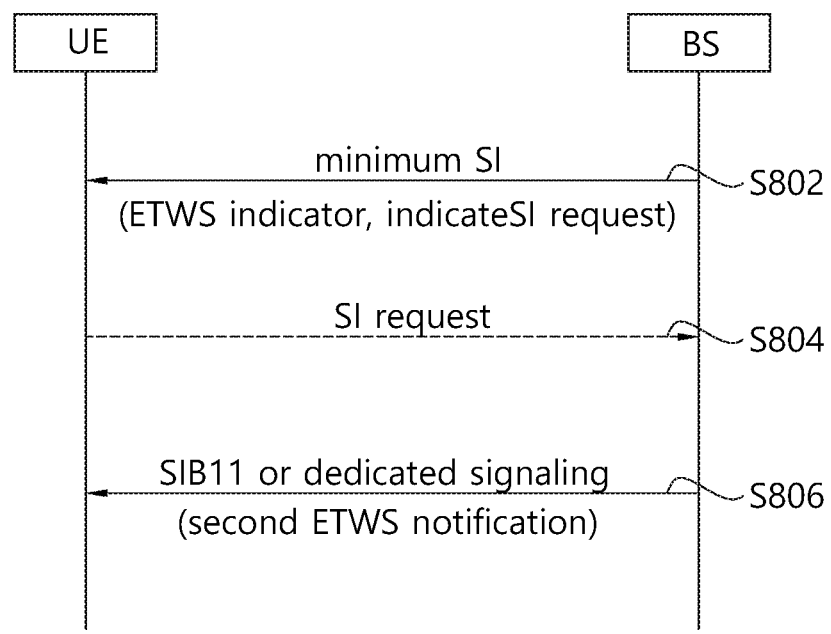
FIG. 8 is a flowchart for describing a method for executing a public warning system according to another embodiment of the present invention.

FIG. 8 is a flowchart for describing a method for executing a public warning system according to another embodiment of the present invention.

In 702, the base station may transmit the primary message to the terminal through minimum SI. The minimum SI may be MIB or SIB1. The primary message may include an ETWS indicator. Specifically, the ETWS indicator is a PWS related primary notification, which may indicate that a PWS related secondary message needs to be transmitted. That is, the ETWS indicator may indicate that a subsequent PWS related secondary message will be transmitted when the SI request is received from the terminal to the base station.

In S804, the terminal may request transmission of the PWS related secondary message through the SI request. The PWS related secondary message may be, for example, an ETWS secondary notification.

In 806, the base station may transmit the PWS related secondary message to the terminal. According to an embodiment, the base station may provide the PWS related secondary message to the terminal in a broadcast scheme by transmitting the system information block (e.g., SIB11). In addition, the base station may transmit the PWS related secondary message to the terminal through a dedicated signaling scheme such as unicast transmission.

Figure 9:
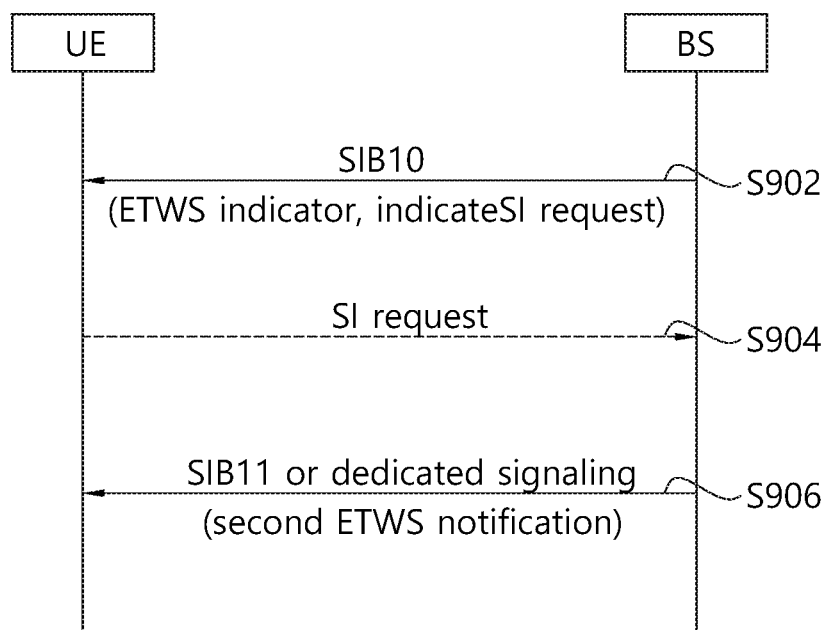
FIG. 9 is a flowchart for describing a method for executing a public warning system according to another embodiment of the present invention.

FIG. 9 is a flowchart for describing a method for executing a public warning system according to another embodiment of the present invention.

In 902, the base station may transmit the primary message to the terminal through minimum SIB10. The primary message may include an ETWS indicator. Specifically, the ETWS indicator is a PWS related primary notification, which may indicate that a PWS related secondary message needs to be transmitted. That is, the ETWS indicator may indicate that a subsequent PWS related secondary message will be transmitted when the SI request is received from the terminal to the base station.

In S904, the terminal may request transmission of the PWS related secondary message through the SI request. The PWS related secondary message may be, for example, an ETWS secondary notification.

In 906, the base station may transmit the PWS related secondary message to the terminal. According to an embodiment, the base station may provide the PWS related secondary message to the terminal in a broadcast scheme by transmitting the system information block (e.g., SIB11). In addition, the base station may transmit the PWS related secondary message to the terminal through a dedicated signaling scheme such as unicast transmission.

Figure 10:
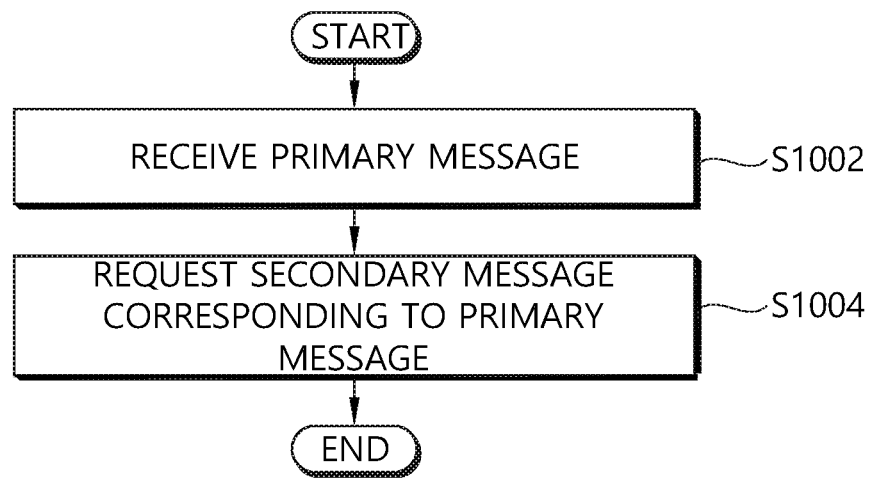
FIG. 10 is a flowchart for describing a method for executing a public warning system according to an embodiment of the present invention.

FIG. 10 is a flowchart for describing a method for executing a public warning system according to an embodiment of the present invention.

In 1002, the terminal may receive a primary message associated with the PWS from the base station. The primary message may be transmitted to the terminal through at least one of minimum system information (minimum SI), system information block 10 (SIB10) and a paging message.

In S1004, the terminal may transmit a feedback message requesting a secondary message corresponding to the primary message to the base station. In the present embodiment, the feedback message may correspond to the SI request described above. Specifically, the feedback message may be configured to transmit the secondary message by indicating at least one of a message identifier (meesageIdentifier) indicating the source and type of the secondary message, a serial number (serialNumber) for identifying whether the secondary message has been changed, a warning message segment (warningMessageSegment) indicating a segment of an element included in the secondary message, a warning message segment number (warningMessageSegmentNumber) indicating a segment number of an element included in the secondary message, a warning message segment type (warningMessageSegmentType) indicating a segment type of an element included in the secondary message, and a data coding scheme (dataCodingScheme) of the secondary message. In addition, the terminal may receive the secondary message from the base station. The secondary message may be provided by the base station provided that the feedback message is received from the terminal. The secondary message may be transmitted through dedicated signaling or a system information message.

The primary message and the secondary message are associated with any one of an Earthquake & Tsunami Warning System (ETWS) notification message, a Commercial Mobile Alert System (CMAS) notification message, and a Korean Public Alert System (KPAS) notification message. The feedback message may be any one of a random access preamble, a MAC control element, and an RRC message.

Figure 11:
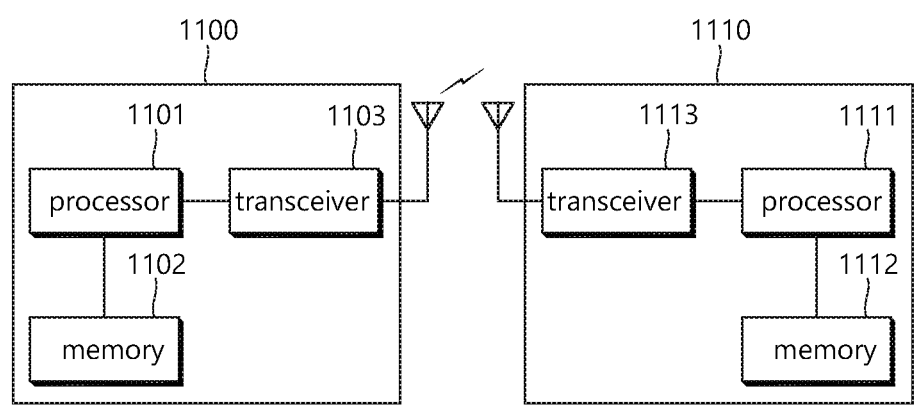
FIG. 11 is a block diagram of a wireless communication system in which an embodiment of the present invention is implemented.

FIG. 11 is a block diagram illustrating a wireless apparatus in which an embodiment of the present invention can be implemented.

ABS 1100 includes a processor 1101, a memory 1102, and a radio frequency (RF) unit 1103. The memory 1102 is coupled to the processor 1101, and stores a variety of information for driving the processor 1101. The RF unit 1103 is coupled to the processor 1101, and transmits and/or receives a radio signal. The processor 1101 implements the proposed functions, procedures, and/or methods. In the aforementioned embodiments, an operation of the BS may be implemented by the processor 1101.

A UE 1110 includes a processor 1111, a memory 1112, and an RF unit 1113. The memory 1112 is coupled to the processor 1111, and stores a variety of information for driving the processor 1111. The RF unit 1113 is coupled to the processor 1111, and transmits and/or receives a radio signal. The processor 61 implements the proposed functions, procedures, and/or methods. In the aforementioned embodiments, an operation of the UE 1110 may be implemented by the processor 1111.

The processors 1111 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a terminal in a wireless communication system, the method comprising:
receiving, from a base station, a minimum system information including information on a public warning message for a public warning system (PWS), wherein the public warning message consists of a primary message and a secondary message;
receiving a primary message associated with the PWS via System Information Block 10 (SIB 10) based on the minimum system information, wherein the SIB 10 is broadcasted by multiple base stations; and
transmitting, to the base station, a feedback message requesting the secondary message corresponding to the primary message upon determining that the minimum system information does not schedule broadcast for the secondary message, wherein the feedback message is a Medium Access Control (MAC) control element; and
receiving, from the base station, the secondary message indicated by the feedback message via a dedicated signaling using unicast transmission, and
wherein the public warning message is associated with any one of an Earthquake & Tsunami Warning System (ETWS) notification message, a Commercial Mobile Alert System (CMAS) notification message, and a Korean Public Alert System (KPAS) notification message,
wherein the feedback message indicates (1) a message identifier indicating the source and type of the secondary message, (2) a serial number for identifying whether the secondary message has been changed, (3) a warning message segment indicating a segment of an element included in the secondary message, (4) a warning message segment number indicating a segment number of an element included in the secondary message, (5) a warning message segment type indicating a segment type of an element included in the secondary message, and (6) a data coding scheme of the secondary message.

2. The method of claim 1, wherein the terminal communicates with at least one of a mobile terminal, a network or autonomous vehicles other than the terminal.

3. A terminal in a wireless communication system, the terminal comprising:
- a memory;
- a transceiver; and
- a processor connecting the memory and the transceiver with each other and configured to:
- control the transceiver to receive, from a base station, a minimum system information including information on a public warning message for a public warning system (PWS), wherein the public warning message consists of a primary message and a secondary message;
- control the transceiver to receive a primary message associated with the PWS via System Information Block 10 (SIB10) based on the minimum system information, wherein the SIB 10 is broadcasted by multiple base stations;
- control the transceiver to transmit, to the base station, a feedback message requesting the secondary message corresponding to the primary message upon determining that the a minimum system information does not schedule broadcast for the secondary message, wherein the feedback message is a Medium Access Control (MAC) control element; and
- control the transceiver to receive, from the base station, the secondary message indicated by the feedback message via a dedicated signaling using unicast transmission, wherein the public warning message is associated with any one of an Earthquake & Tsunami Warning System (ETWS) notification message, a Commercial Mobile Alert System (CMAS) notification message, and a Korean Public Alert System (KPAS) notification message, and wherein the feedback message indicates (1) a message identifier indicating the source and type of the secondary message, (2) a serial number for identifying whether the secondary message has been changed, (3) a warning message segment indicating a segment of an element included in the secondary message, (4) a warning message segment number indicating a segment number of an element included in the secondary message, (5) a warning message segment type indicating a segment type of an element included in the secondary message, and (6) a data coding scheme of the secondary message.

* * * * *